(12) United States Patent
Yaita (10) Patent No.: US 10,249,966 B2
(45) Date of Patent: Apr. 2, 2019

(54) BATTERY WIRING MODULE

(71) Applicant: Sumitomo Wiring Systems, Ltd., Yokkaichi, Mie (JP)

(72) Inventor: Hisayoshi Yaita, Mie (JP)

(73) Assignee: Sumitomo Wiring Systems, Ltd., Yokkaichi, Mie (JP)

( * ) Notice: Subject to any disclaimer, the term of this patent is extended or adjusted under 35 U.S.C. 154(b) by 0 days.

(21) Appl. No.: 15/916,928

(22) Filed: Mar. 9, 2018

(65) Prior Publication Data

US 2018/0277969 A1 Sep. 27, 2018

(30) Foreign Application Priority Data

Mar. 21, 2017 (JP) .................. 2017-054780

(51) Int. Cl.
| | |
|---|---|
| *H01R 13/46* | (2006.01) |
| *H01R 11/28* | (2006.01) |
| *H01M 2/20* | (2006.01) |
| *H01M 2/10* | (2006.01) |
| *H01M 10/48* | (2006.01) |
| *H01R 9/26* | (2006.01) |
| *H01R 9/24* | (2006.01) |
| *H01R 13/447* | (2006.01) |
| *H01M 10/42* | (2006.01) |

(52) U.S. Cl.
CPC ........ *H01R 11/288* (2013.01); *H01M 2/1077* (2013.01); *H01M 2/206* (2013.01); *H01M 10/482* (2013.01); *H01R 9/2475* (2013.01); *H01R 9/2683* (2013.01); *H01R 13/447* (2013.01); *H01R 13/465* (2013.01); *H01M 2010/4271* (2013.01); *H01M 2220/20* (2013.01)

(58) Field of Classification Search
CPC .. H01R 11/288; H01R 11/281; H01R 13/465; H01R 9/2475; H01R 9/2683; H01R 13/447; H01M 2010/4271; H01M 2/06; H01M 2/20; H01M 2/202; H01M 2/344; H01M 2/04
See application file for complete search history.

(56) References Cited

U.S. PATENT DOCUMENTS

| | | | | |
|---|---|---|---|---|
| 2,671,888 | A * | 3/1954 | Hadden ................ | H01R 9/2475 439/713 |
| 4,784,614 | A * | 11/1988 | Sadigh-Behzadi .... | H01R 13/64 439/488 |
| 5,313,372 | A * | 5/1994 | Chabert ................ | H01R 9/223 361/823 |

(Continued)

FOREIGN PATENT DOCUMENTS

JP 2016201336 A 12/2016

*Primary Examiner* — Felix O Figueroa
(74) *Attorney, Agent, or Firm* — Reising Ethington, P.C.

(57) ABSTRACT

A battery wiring module that allows an operator to easily perform operations. A battery wiring module includes: bus bars and electrical wires, which are to be electrically connected to an on-board secondary battery; a housing that is to be attached to the secondary battery, and includes bus bar housing portions and an electrical wire housing portion that house the bus bars and the electrical wires; and a second lid for closing openings of the bus bar housing portions. Information indicators that indicate operational information ("+", "−") are provided on the top and back faces of the second lid.

2 Claims, 4 Drawing Sheets

(56) References Cited

U.S. PATENT DOCUMENTS

| | | | | |
|---|---|---|---|---|
| 5,536,595 | A * | 7/1996 | Inkmann | B60R 16/04 |
| | | | | 180/68.5 |
| 5,906,505 | A * | 5/1999 | McCurdy, Jr. | H01M 2/30 |
| | | | | 439/500 |
| 6,261,719 | B1 * | 7/2001 | Ikeda | H01M 2/202 |
| | | | | 429/120 |
| 6,523,274 | B1 * | 2/2003 | Saito | B60R 16/0239 |
| | | | | 180/68.5 |
| 7,077,704 | B2 * | 7/2006 | Ikeda | H01M 2/206 |
| | | | | 439/251 |
| 9,209,440 | B2 * | 12/2015 | Callicoat | H01M 2/1016 |
| 10,014,603 | B2 * | 7/2018 | Onoda | H01R 11/287 |

* cited by examiner

BATTERY WIRING MODULE

CROSS REFERENCE TO RELATED APPLICATIONS

This application claims the priority of Japanese patent application JP2017-054780 filed on Mar. 21, 2017, the entire contents of which are incorporated herein.

TECHNICAL FIELD

The present application relates to a battery wiring module that is to be attached to a high-voltage secondary battery for a vehicle.

BACKGROUND ART

For example, as disclosed in JP 2016-201336A, a battery wiring module is attached to a high-voltage secondary battery that is mounted on a vehicle such as an electric vehicle or a hybrid vehicle as a power supply for the vehicle to travel. A battery wiring module includes, for example: wiring that includes, for example, bus bars that are to be connected to connection terminals that extend from a secondary battery, and electrical wires that are connected to the bus bars; a housing that includes wiring housing portions that house the wiring; and a covering for closing openings of the wiring housing portions. The covering covers the wiring housing portions to prevent other members from coming into contact with the bus bars, and to protect the electrical wires, for example.

JP 2016-201336A is an example of related art.

SUMMARY

An operator may wish to discern between the positive electrode side and the negative electrode side when performing operations, such as when performing an operation to attach a battery wiring module (a housing, a covering, etc.) to a secondary battery, and when performing an operation to attach a secondary battery, to which the battery wiring module is attached, to a vehicle. Also, if the covering includes a locking portion such as a claw for locking the covering to the housing, an operator may wish to discern the position of the locking portion when performing operations, such as when performing an operation to fix the covering to the housing, and an operation to unlock the covering. An operator may wish to discern these points regardless of whether the covering is in a state of closing the openings of the wiring housing portion, or the covering is in a state of not closing the openings. Therefore, there is demand to make it easier for an operator to discern these points and perform operations in both cases.

The present design has been made to solve the above-described problem, and aims to provide a battery wiring module that allows an operator to easily perform operations.

A battery wiring module that solves the above-described problem is a battery wiring module that includes: wiring that is to be electrically connected to an on-board secondary battery; a housing that is to be attached to the secondary battery and includes a wiring housing portion that houses the wiring; and a covering for closing an opening of the wiring housing portion. Information indicators that indicate operational information are provided on top and back faces of the covering.

With this configuration, the information indicators, which indicate operational information, are provided on the top and back faces of the covering. Therefore, the operator can easily recognize the operational information indicated by the information indicators from either the top face side or the back face side of the covering, for example. Thus, the operational information indicated by the information indicators allows the operator to easily perform operations to attach the secondary battery and the battery wiring module to each other, to attach the secondary battery, to which the battery wiring module is attached, to a vehicle, to attach and detach the covering to and from the housing, and to connect various kinds of wiring without error, for example.

In the above-described battery wiring module, it is preferable that the information indicators are formed at the same positions on the top and back faces of the covering, and an information indicator on one of the top and back faces has a recessed shape to indicate operational information, and an information indicator on the other of the top and back faces has a protruding shape to indicate operational information.

With this configuration, the information indicators are formed at the same positions on the top and back faces of the covering, and an information indicator on one of the top and back faces has a recessed shape to indicate operational information, and an information indicator on the other of the top and back faces has a protruding shape to indicate operational information. Therefore, for example, it is possible to prevent a portion of the covering from having a thin plate thickness, unlike in a case where the information indicators on both the top and back faces have a recessed shape. Therefore, for example, it is possible to ensure the rigidity of the covering and insulation thereof from an external part. Also, for example, it is possible to suppress an increase in the amount of material, unlike in a case where information indicators on both the top and back faces have a recessed shape, and protruding portions that may become obstacles are not formed on both the top and back faces.

In the above-described battery wiring module, it is preferable that the information indicators are formed such that a contour of a recessed portion is located inside a contour of a protruding portion when seen in a plate thickness direction of the covering.

With this configuration, the information indicators are formed such that the contour of the recessed portion is located inside the contour of the protruding portion when seen in the plate thickness direction of the covering. Therefore, it is possible to prevent the minimum distance between the top and back faces from being short. Therefore, for example, it is possible to further ensure the rigidity of the covering and insulation thereof from an external part.

In the above-described battery wiring module, it is preferable that the covering is provided with a hinge so as to be openable and closable relative to the housing.

With this configuration, the covering is provided with the hinge so as to be openable and closable relative to the housing. Therefore, the operator can easily recognize operational information regardless of whether the covering is open or closed. That is, for example, in a case where the covering is provided separately from the housing, and the covering covers the opening of the wiring housing portion, it is unlikely that the operator will have difficulties in visually checking the operational information indicated by the information indicators even if the information indicators are formed only on the top face of the covering, which is an outer surface. However, in a case where the covering is provided with the hinge so as to be openable and closable relative to the housing, if information indicators are formed only on the top face of the covering, which is an outer surface, it is likely that the operator will have difficulties in visually checking the operational information indicated by the information indicators when the covering is open. However, the stated configuration makes it possible to avoid such difficulties, and achieve significant effects.

The battery wiring module according to the present design allows an operator to easily perform operations.

EMBODIMENTS

The following describes an embodiment of a battery wiring module with reference to FIGS. 1 to 6. In the following description, three directions that are orthogonal to each other (X, Y, and Z in the drawings) are described as a depth direction X, a width direction Y, and a height direction Z of the battery wiring module, respectively. In the drawings, some portions of components may be exaggerated or simplified for convenience of explanation. In addition, the dimensional ratio of each part may differ from the actual size.

Figure 1:
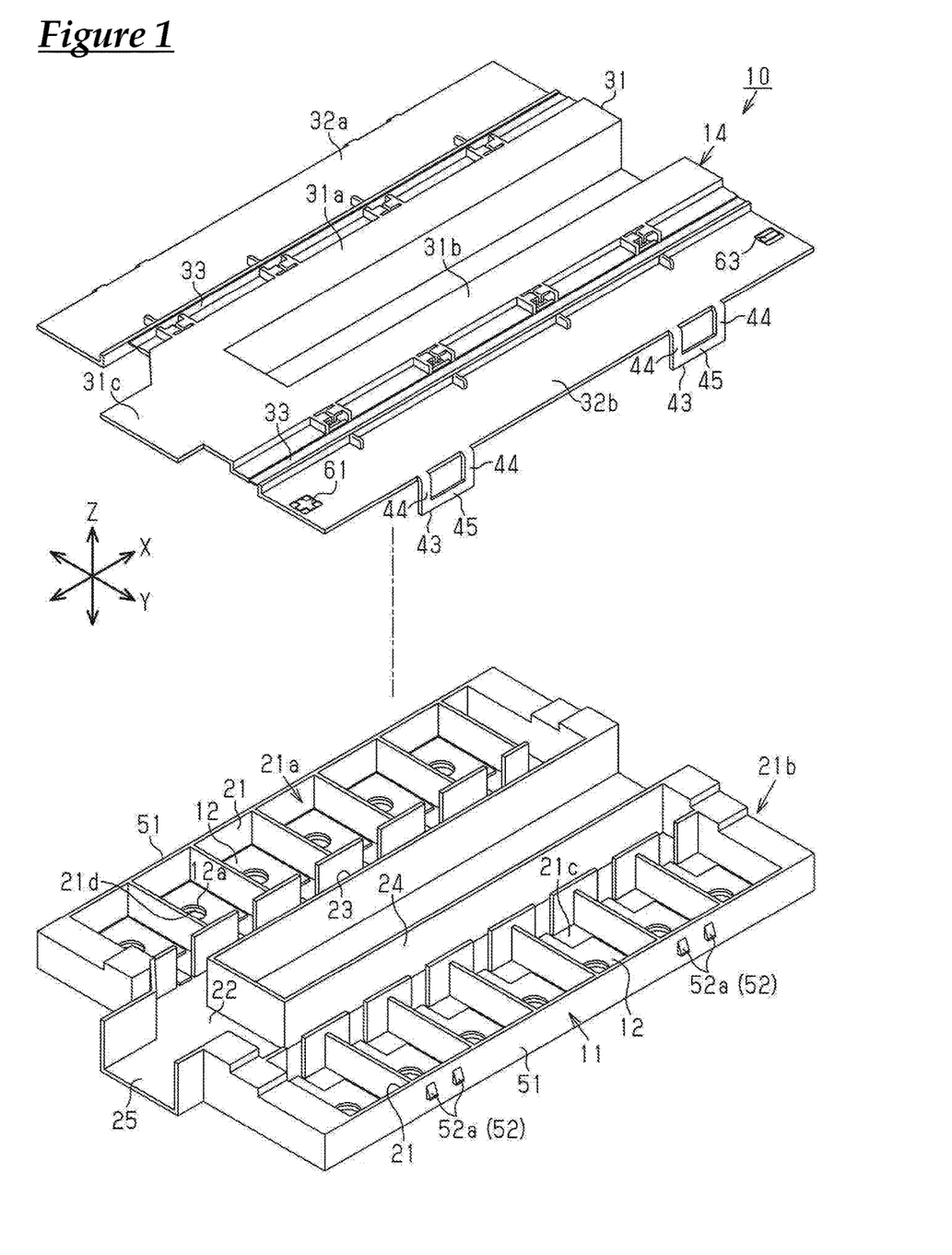
FIG. 1 is an exploded perspective view of a battery wiring module according to an embodiment.

A battery wiring module 10 according to the present embodiment shown in FIG. 1 is to be attached to a high-voltage on-board secondary battery B (see FIG. 4) that is mounted on a vehicle such as an electric vehicle or a hybrid vehicle. The secondary battery B supplies power to a motor for the vehicle to travel (not shown), and is charged using power generated by a motor or a generator, according to the charge state. The secondary battery B is configured as, for example, a battery module formed by stacking a plurality of plate-shaped batteries in the depth direction X. One end of the secondary battery B in the depth direction X is formed as a positive electrode side, and the opposite end in the depth direction X is formed as a negative electrode side.

Figure 2:
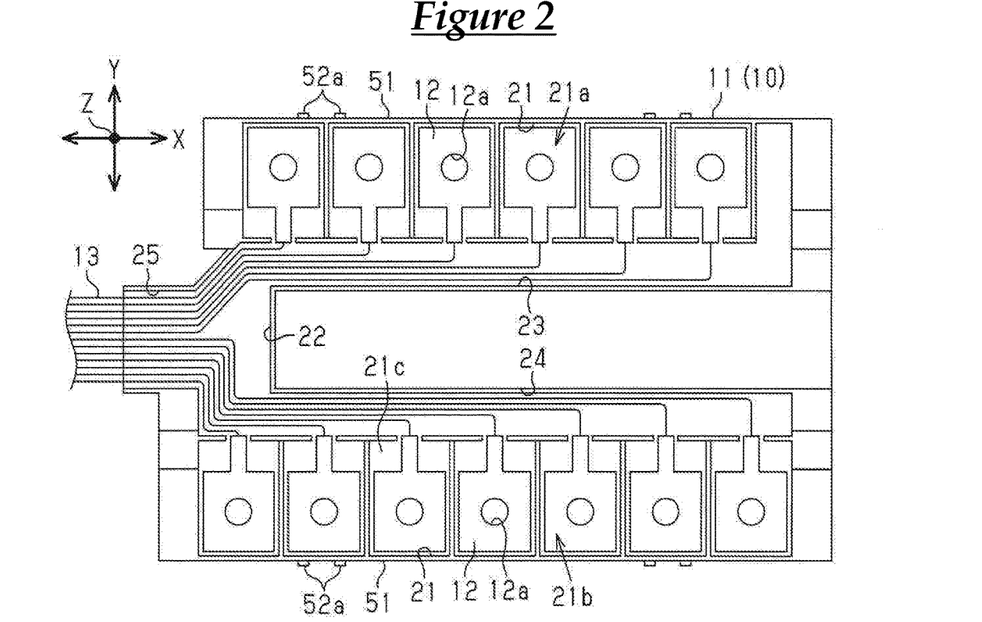
FIG. 2 is a plan view of a battery wiring module from which a covering member has been removed.

As shown in FIGS. 1 and 2, the battery wiring module 10 includes a housing 11 that is attached to an upper portion of the secondary battery B, a plurality of bus bars 12 that are housed in the housing 11, a plurality of electrical wires 13 (see FIG. 2) that are housed in the housing 11 and are connected to the bus bars 12, and a covering member 14 for closing an opening of the housing 11. The plate-shaped batteries included in the secondary battery B are connected to each other in series via the bus bars 12. The housing 11 and the covering member 14 are formed by using an injection molding method, using a synthetic resin material. In the present embodiment, the bus bars 12 and the electrical wires 13 constitute wiring that is electrically connected to the secondary battery B.

The housing 11 includes a plurality of bus bar housing portions 21 that open upward (in a direction away from the secondary battery), and an electrical wire housing portion 22 that also opens upward. The plurality of bus bar housing portions 21 are arranged in two rows in the depth direction X. One of these rows is a first bus bar housing portion row 21a, and the other is a second bus bar housing portion row 21b. A through hole 21d is formed in a bottom portion 21c of each bus bar housing portion 21, and a connection terminal that extends from the secondary battery B side is inserted into each through hole 21d. In the present embodiment, the bus bar housing portions 21 and the electrical wire housing portion 22 constitute a wiring housing portion that houses the wiring.

The electrical wire housing portion 22 of the housing 11 includes a first passage 23 and a second passage 24 that are provided between the first bus bar housing portion row 21a and the second bus bar housing portion row 21b, and an electrical wire lead-out portion 25 that is in communication with the first passage 23 and the second passage 24. The first passage 23 extends in the depth direction X, and is adjacent to the first bus bar housing portion row 21a. The second passage 24 extends in the depth direction X, and is adjacent to the second bus bar housing portion row 21b. The first bus bar housing portion row 21a and the second bus bar housing portion row 21b, and the first passage 23 and the second passage 24 are arranged side by side in the width direction Y. The electrical wire lead-out portion 25 that is in communication with the first and second passages 23 and 24 is provided in one end portion of the housing 11 in the depth direction X.

Each of the bus bar housing portions 21 of the first bus bar housing portion row 21a and the second bus bar housing portion row 21b houses a flat plate-shaped bus bar 12. Specifically, the bus bars 12 are fixed to the bottom portions 21c of the bus bar housing portions 21. A terminal insertion hole 12a that penetrates in the height direction Z is formed in each bus bar 12. The aforementioned connection terminals that extend from the secondary battery B are inserted into the terminal insertion holes 12a. The connection terminals and the bus bars 12 are electrically connected to each other by being fastened to each other using bolts, or by being welded to each other.

As shown in FIG. 2, the plurality of electrical wires 13 are connected to the bus bars 12. Electrical wires 13 that are connected to the bus bars 12 in the bus bar housing portions 21 of the first bus bar housing portion row 21a are routed to the electrical wire lead-out portion 25 via the first passage 23. Electrical wires 13 that are connected to the bus bars 12 in the bus bar housing portions 21 of the second bus bar housing portion row 21b are routed to the electrical wire lead-out portion 25 via the second passage 24. End portions of the electrical wires 13 led out of the electrical wire lead-out portion 25 are connected to connector portions (not shown), for example. The connector portions are connected to, for example, an ECU (electronic control unit) for charging control, which is mounted on a vehicle.

As shown in FIG. 1, the covering member 14 includes a first lid 31 that covers the electrical wire housing portion 22 from above, and a pair of second lids 32a and 32b that serve as coverings that respectively cover the first bus bar housing portion row 21a and the second bus bar housing portion row 21b from above, and hinges 33 that couple the first lid 31 and the second lids 32a and 32b to each other.

The first lid 31 includes a first covering-target portion 31a that covers the first passage 23 from above, a second covering-target portion 31b that covers the second passage 24 from above, and a third covering portion 31c that covers the electrical wire lead-out portion 25 from above. The first covering-target portion 31a and the second covering-target portion 31b extend in the depth direction X so as to match the shapes of the first passage 23 and the second passage 24.

The second lid 32a is coupled to an outer end portion of the first covering-target portion 31a in the width direction Y with a hinge 33 being interposed therebetween. Similarly, the second lid 32b is coupled to an outer end portion of the second covering-target portion 31b in the width direction Y with a hinge 33 being interposed therebetween.

Next, the configurations, such as the shapes, of the second lids 32a and 32b will be described. The following describes the configurations of the second lids 32a and 32b at closed positions (in an expanded state, see FIGS. 1 and 4) where the second lids 32a and 32b cover the bus bar housing portion rows 21a and 21b from above.

As shown in FIG. 1, the second lids 32a and 32b have a plate-like shape that is orthogonal to the height direction Z.

Also, at the closed positions (in the expanded state), the second lids 32a and 32b are locked to the housing 11 with a snap-fit structure. Specifically, outer end portions of the second lids 32a and 32b in the width direction Y are provided with elastic lock pieces 43 that are to be fixed to the housing 11. In the present embodiment, each of the second lids 32a and 32b is provided with two elastic lock pieces 43. Each elastic lock piece 43 includes a pair of extension portions 44 that extend downward from an outer end portion of the second lid 32a or 32b, and a locking portion 45 that is formed to connect lower end portions of the pair of extension portions 44 to each other.

The elastic lock pieces 43 are locked to lock-target portions 52 that are formed on outer surfaces of side wall portions 51 of the housing 11 at both ends in the width direction Y. Note that the side wall portions 51 constitute outer wall portions of the bus bar housing portion rows 21a and 21b in the width direction Y, and extend in the depth direction X. Each lock-target portion 52 includes a pair of locking protrusions 52a that extend outward from a side wall portion 51 in the width direction Y. Each elastic lock piece 43 is locked to a pair of locking protrusions 52a relative to the height direction Z. Thus, the second lids 32a and 32b are held at the closed positions (in an expanded state) where the second lids 32a and 32b cover the bus bar housing portion rows 21a and 21b from above.

Next, the following describes the second lids 32a and 32b that are at open positions (in a retracted state, see FIG. 3) where the second lids 32a and 32b do not cover the bus bar housing portion rows 21a and 21b from above.

Figure 3:
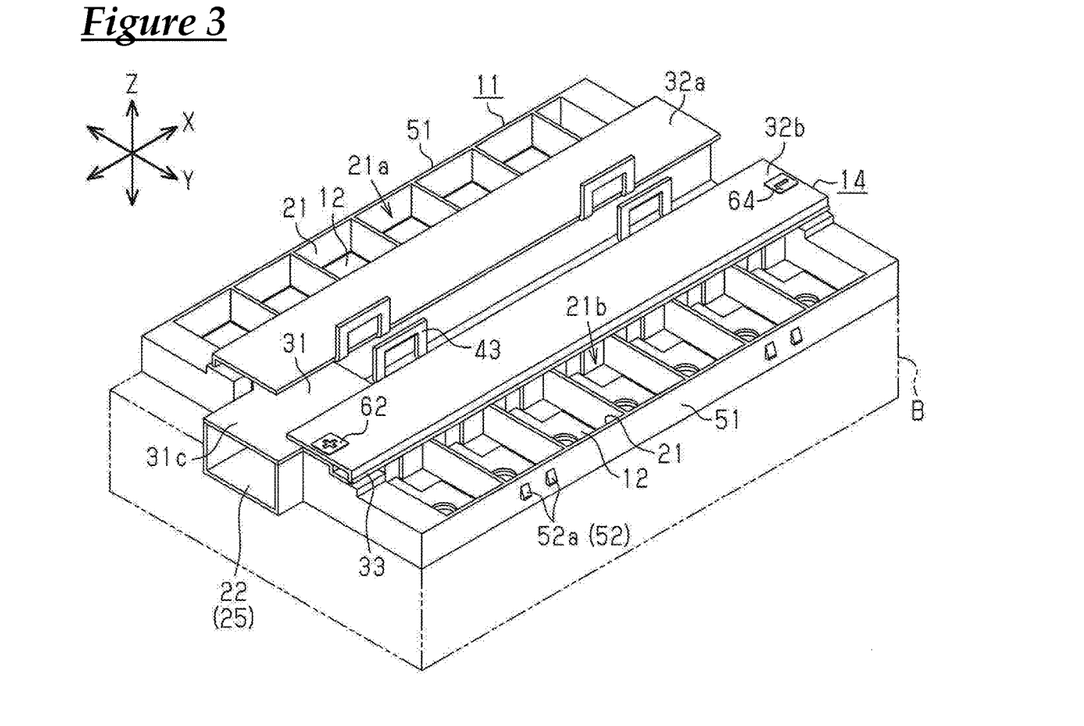
FIG. 3 is a perspective view for illustrating how the battery wiring module according to the embodiment is attached.

The second lids 32a and 32b are coupled to the first lid 31 using the hinges 33, so as to be rotatable relative to the first lid 31. In the state where the first lid 31 is attached to the housing 11, the second lids 32a and 32b can open and close the housing 11 (specifically, the bus bar housing portions 21 of the wiring housing portion). That is, the second lids 32a and 32b are rotatable between a retracted state (the open positions) and an expanded state (the closed positions). In the present embodiment, each of the second lids 32a and 32b in an expanded state can be brought into a retracted state, for example, by being rotated by 180 degrees about the hinge 33. In a retracted state, the second lid 32a overlaps the first covering-target portion 31a from above, and the second lid 32b overlaps the second covering-target portion 31b from above. Note that the hinges 33 are flexible portions that are thinner than the first lid 31 and the second lids 32a and 32b.

Figure 4:
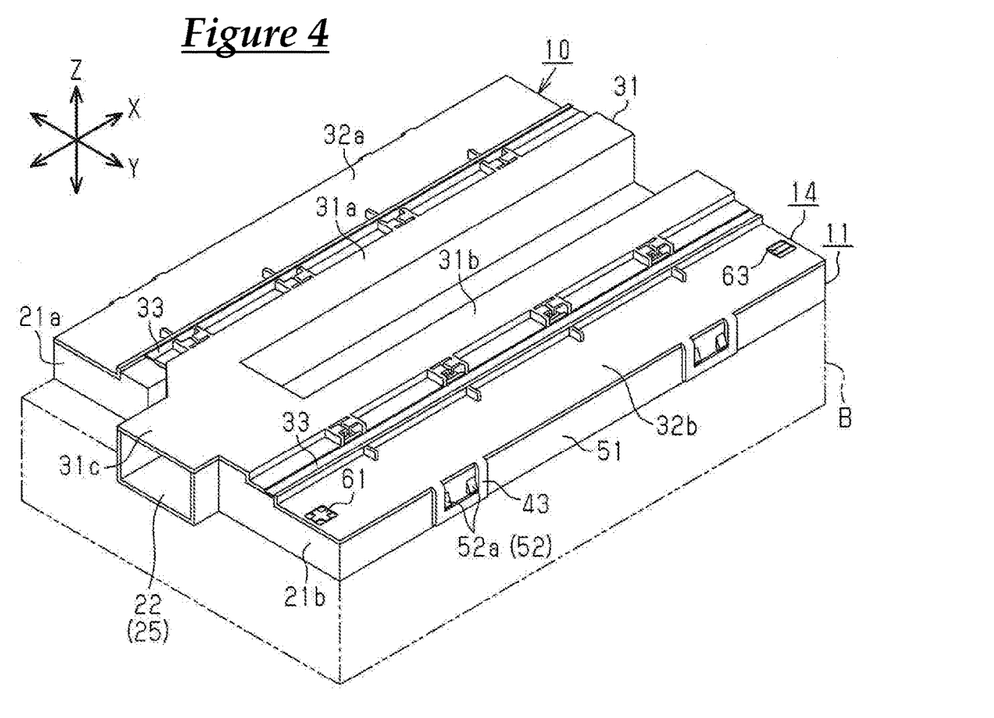
FIG. 4 is a perspective view for illustrating how the battery wiring module according to the embodiment is attached.

Here, as shown in FIGS. 3 and 4, information indicators 61 to 64, which display operational information, are formed on the top and back faces of the second lid 32b. Operational information in the present embodiment is information that indicates the positive electrode side and the negative electrode side, which are respectively represented as "+" and "−" signs (marks).

Specifically, the information indicators 61 to 64 are formed at the same positions on the top and back faces of the second lid 32b. In the present embodiment, first information indicators 61 and 62, which indicate the positive electrode side, are formed at the same positions on the top and back faces of one end portion of the second lid 32b in the depth direction X (on the electrical wire lead-out portion 25 side), and second information indicators 63 and 64, which indicate the negative electrode side, are formed at the same positions on the top and back faces of the opposite end portion of the second lid 32b in the depth direction X.

The information indicators 61 and 63 on the top face of the second lid 32b, which is an outer surface of the second lid 32b, have a recessed shape to indicate the operational information, and the information indicators 62 and 64 on the back face of the second lid 32b have a protruding shape to indicate the operational information. Specifically, in the first information indicator 61 on the back face of the second lid 32b, the "+" sign itself is not recessed (relative to a plane including the back face of the second lid 32b), and a portion included in a square that surrounds the "+" sign is recessed so that the "+" sign is left. The first information indicator 61 thus indicates the operational information "+". In the first information indicator 62 on the back face of the second lid 32b, the "+" sign itself does not protrude (relative to a plane including the back face of the second lid 32b), and a portion included in a square that surrounds the "+" sign protrudes so that the "+" sign is left. The first information indicator 62 thus indicates the operational information "+". In the second information indicator 63 on the top face of the second lid 32b, the "−" sign itself is not recessed (relative to a plane including the top face of the second lid 32b), and a portion included in a square that surrounds the "−" sign is recessed so that the "−" sign is left. The second information indicator 63 thus indicates the operational information "−". In the second information indicator 64 on the back face of the second lid 32b, the "−" sign itself does not protrude (relative to a plane including the back face of the second lid 32b), and a portion included in a square that surrounds the "−" sign protrudes so that the "−" sign is left. The second information indicator 64 thus indicates the operational information "−".

Figure 5A:
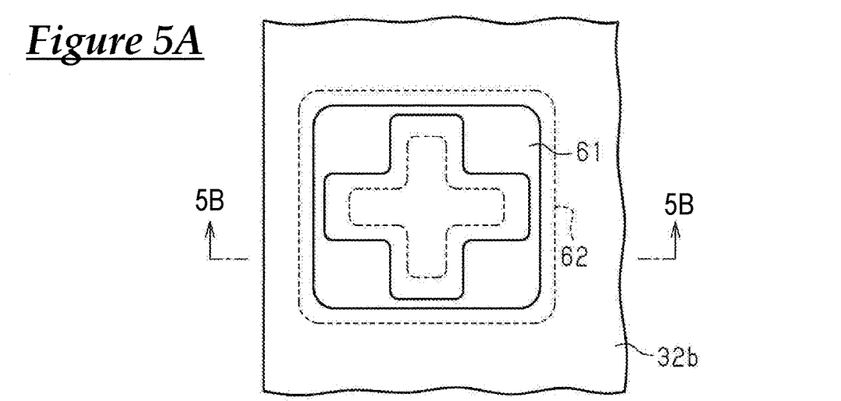
FIG. 5A is a plan view showing a first information indicator according to the embodiment.
Figure 5B:
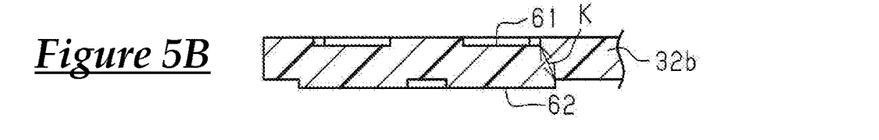
FIG. 5B is a cross-sectional view along a line A-A in FIG. 5A.

Also, as shown in FIG. 5A, in the first information indicators 61 and 62 seen in the plate thickness direction of the second lid 32b, the contour of the recessed portion (in FIG. 5A, the contour represented as a solid line, which is the contour of the portion that is recessed relative to a plane including the top face) is located inside the contour of the protruding portion (in FIG. 5A, the contour represented as a dotted line, which is the contour of the portion that protrudes relative to a plane including the back face). Thus, as shown in FIG. 5B, a minimum distance K between the top and back faces of the second lid 32b is inclined relative to the plate thickness direction, and the minimum distance is longer than that in a case where the contour of the recessed portion coincides with the contour of the protruding portion when seen in the plate thickness direction. In the present embodiment, the plate thickness of portions of the second lid 32b in which the information indicators 61 to 64 are not formed is set to 1.0 mm, and the contours are set such that the minimum distance K is 0.8 mm.

Figure 6:
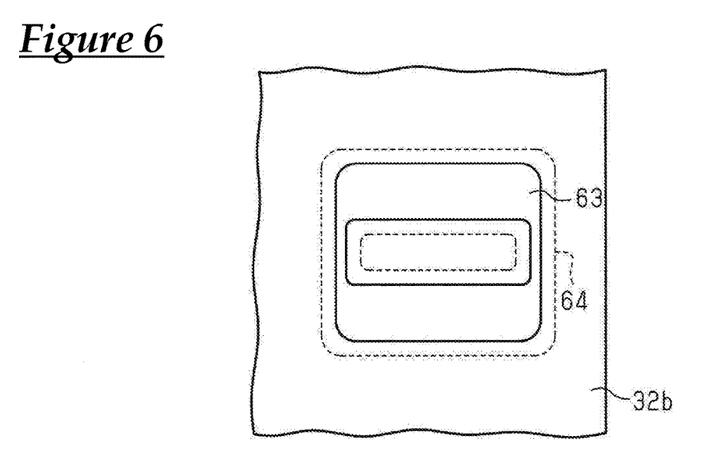
FIG. 6 is a plan view showing a second information indicator according to the embodiment.

Similarly, as shown in FIG. 6, in the second information indicators 63 and 64 seen in the plate thickness direction of the second lid 32*b*, the contour of the recessed portion (in FIG. 6, the contour represented as a solid line, which is the contour of the portion that is recessed relative to a plane including the top face) is located inside the contour of the protruding portion (in FIG. 6, the contour represented as a dotted line, which is the contour that protrudes relative to a plane including the back face).

Next, how the battery wiring module 10 is attached to the secondary battery B and the effects of the present embodiment will be described.

First, as shown in FIG. 2, the bus bars 12 in the bus bar housing portions 21 and end portions of the electrical wires 13 are connected to each other, and the electrical wires 13 are routed in the electrical wire housing portion 22.

Next, as shown in FIG. 3, the covering member 14, in which the second lids 32*a* and 32*b* are in a retracted state (at the open positions), is attached to the housing 11. At this time, the operator can recognize the operational information ("+" and "−") by visually checking the information indicators 62 and 64 on the back face of the second lid 32*b*. In this state, the first lid 31 of the covering member 14 covers the electrical wire housing portion 22, in which the electrical wires 13 are housed, from above. Thus, the electrical wires 13 in the electrical wire housing portion 22 are appropriately protected. Note that electrical wires 13 routed in the electrical wire housing portion 22 are omitted from FIGS. 3 and 4.

Thereafter, the housing 11 is attached to the secondary battery B. Also at this time, the operator can recognize the operational information ("+" and "−") by visually checking the information indicators 62 and 64 on the back face of the second lid 32*b*. Then, the connection terminals, which extend from the secondary battery B, are inserted into the terminal insertion holes 12*a* of the bus bars 12, and the connection terminals and the bus bars 12 are electrically connected to each other, for example, by being fastened to each other using bolts, or by being welded to each other, as described above.

Next, as shown in FIG. 4, the second lids 32*a* and 32*b* are rotated to the closed positions, so that the second lids 32*a* and 32*b* cover the bus bar housing portion rows 21*a* and 21*b* from above. Upon the second lids 32*a* and 32*b* being rotated to the closed positions, the elastic lock pieces 43 (the locking portions 45) of the second lids 32*a* and 32*b* are locked to the lock-target portions 52 (the pairs of locking protrusions 52*a*) of the housing 11, and the second lids 32*a* and 32*b* are fixed at the closed positions. The covering member 14, which covers (the openings of) the electrical wire housing portion 22 and the bus bar housing portion rows 21*a* and 21*b* from above, is thus attached. Then, when the secondary battery B, to which the battery wiring module 10 is thus attached, is to be attached to a vehicle, the operator can recognize the operational information ("+" and "−") by visually checking the information indicators 61 and 63 on the top face of the second lid 32*b*.

Next, the following described the effects of the above-described embodiment.

The information indicators 61 to 64, which indicate the operational information ("+" and "−"), are provided on the top and back faces of the second lid 32*b*. Therefore, the operator can easily recognize the operational information indicated by the information indicators 61 to 64 from either the top face side or the back face side of the second lid 32*b*, for example. Thus, the operational information indicated by the information indicators 61 to 64 allows the operator to easily attach the secondary battery B and the battery wiring module 10 to each other, and attach the secondary battery B, to which the battery wiring module 10 is attached, to a vehicle, for example.

The information indicators 61 to 64 are formed at the same positions on the top and back faces of the second lid 32*b*, and the information indicators 61 and 63 on the top face have a recessed shape to indicate operational information, and the information indicators 62 and 64 on the back face have a protruding shape to indicate operational information. Therefore, it is possible to prevent a portion of the second lid 32*b* from having a thin plate thickness, unlike in a case where the information indicators on both the top and back faces have a recessed shape. Therefore, for example, it is possible to ensure the rigidity of the second lid 32*b* and insulation thereof from an external part. Also, for example, it is possible to suppress an increase in the amount of material, unlike in a case where information indicators on both the top and back faces have a recessed shape, and protruding portions that may become obstacles are not formed on both the top and back faces.

In the information indicators 61 to 64, the contour of the recessed portion is located inside the contour of the protruding portion when seen in the plate thickness direction of the second lid 32*b*. Therefore, it is possible to prevent the minimum distance K between the top and back faces from being short. Therefore, for example, it is possible to further ensure the rigidity of the second lid 32*b* and insulation thereof from an external part.

The second lid 32*b* is provided with a hinge 33 so as to be openable and closable relative to the housing 11. Therefore, the operator can easily recognize operational information regardless of whether the second lid 32*b* is open or closed. That is, for example, in a case where the second lid 32*b* is provided separately from the housing 11 and the first lid 31, and the second lid 32*b* covers the openings of the bus bar housing portion rows 21*a* and 21*b* from above, it is unlikely that the operator will have difficulties in visually checking the operational information indicated by the information indicators even if the information indicators are formed only on the top face of the second lid 32*b*, which is an outer surface. However, in a case where the second lid 32*b* is provided with a hinge 33 so as to be openable and closable relative to the housing 11, if information indicators are formed only on the top face of the second lid 32*b*, which is an outer surface, it is likely that the operator will have difficulties in visually checking the operational information indicated by the information indicators when the second lid 32*b* is open. The stated configuration makes it is possible to avoid such difficulties, and achieve significant effects.

Among the information indicators 61 to 64, information indicators on the top face of the second lid 32*b*, which is an outer surface, have a recessed shape, and information indicators on the back face of the second lid 32*b* have a protruding shape. Therefore, despite the presence of the information indicators 61 to 64, the outer surface does not include a locally protruding portion. Thus, the information indicators 61 to 64 are prevented from becoming obstacles when another member is to be provided on the outer surface, for example.

The above-described embodiment may be modified as follows.

In the above-described embodiment, the information indicators 61 to 64 are formed on the top and back faces of the second lid 32*b* of the covering member 14 that is to be attached to the housing 11. However, the information indicators may be formed on the top and back faces of a covering that has another configuration, as long as the covering is for closing at least one or more openings in the wiring housing portion (the bus bar housing portions 21 and the electrical wire housing portion 22).

Figure 7:
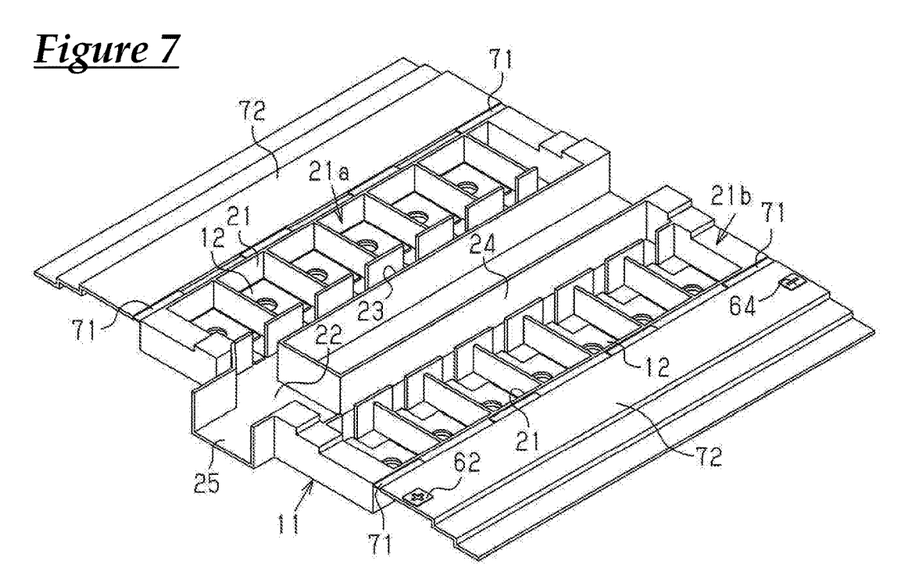
FIG. 7 is a perspective view of a battery wiring module according to another embodiment.

For example, as shown in FIG. 7, the information indicators 61 to 64 may be provided on the top and back faces of an openable/closable lid 72, which is a covering that is formed integrally with the housing 11 and is provided so as to be openable and closable relative to the housing 11, using thin hinges 71. Although FIG. 7 only shows the information indicators 62 and 64 on the back face of the openable/closable lid 72, the information indicators 61 and 63 are formed on the top face of the openable/closable lid 72 in the same manner as in the above-described embodiment.

In the above-described embodiment, the information indicators 61 to 64 are formed at the same positions on the top and back faces of the second lid 32*b*. However, the information indicators 61 to 64 are not limited to such a configuration, and may be formed at positions that are displaced from each other.

In the above-described embodiment, the information indicators 61 and 63 on the top face have a recessed shape to indicate operational information, and the information indicators 62 and 64 on the back face have a protruding shape to indicate operational information. However, the information indicators 61 to 64 are not limited to such a configuration, and may indicate operation information in any manner. For example, the information indicators 61 and 63 on the top face may have a protruding shape to indicate operational information, and the information indicators 62 and 64 on the back face may have a recessed shape to indicate operational information. Alternatively, for example, all of the information indicators 61 to 64 on the top and back faces may have a protruding shape or a recessed shape to indicate operational information.

In the above-described embodiment, the information indicators 61 to 64 are formed such that the contour of the recessed portion is located inside the contour of the protruding portion when seen in the plate thickness direction of the second lid 32*b*. However, the information indicators 61 to 64 are not limited to such a configuration, and may be formed such that the contour of the recessed portion coincides with the contour of the protruding portion.

In the above-described embodiment, operational information is represented as "+" and "−" signs (marks), and is information that indicates the positive electrode side and the negative electrode side. However, operational information is not limited to such a configuration, and may be changed to different information. For example, if it is difficult to see a lock portion such as a claw for locking a covering to a housing, operational information may be an arrow mark or the like that indicates the position of the lock portion. With such a configuration, the operator can easily recognize the position of the lock portion when performing an operation to fix the covering to the housing, to unlock the covering, and so on.

A technical concept that can be obtained from the above-described embodiment is described below.

The battery wiring module according to claim 2, wherein information indicators on the top face of the covering, which is an outer surface, have a recessed shape, and information indicators on the back face of the covering have a protruding shape.

With this configuration, information indicators on the top face of the covering, which is an outer surface, have a recessed shape, and information indicators on the back face of the covering have a protruding shape. Therefore, despite the presence of the information indicators, the outer surface does not include a locally protruding portion. Thus, the information indicators are prevented from becoming obstacles when another member is to be provided on the outer surface, for example.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS

B: Secondary Battery
10: Battery Wiring Module
11: Housing
12: Bus Bar (Wiring)
13: Electrical Wire (Wiring)
21: Bus Bar Housing Portion (Wiring Housing Portion)
22: Electrical Wire Housing Portion (Wiring Housing Portion)
32*b*: Second Lid (Covering)
33, 71: Hinge
61 to 64: Information Indicator
72: Openable/Closable Lid (Covering)

What is claimed is:

1. A battery wiring module comprising:
   wiring that is to be electrically connected to an on-board secondary battery;
   a housing that is to be attached to the secondary battery and includes a wiring housing portion that houses the wiring; and
   a covering for closing an opening of the wiring housing portion,
   wherein information indicators that indicate operational information are provided on top and back faces of the covering,
   the information indicators are formed at same positions on the top and back faces of the covering, and an information indicator on one of the top and back faces has a recessed portion to indicate operational information, and an information indicator on the other of the top and back faces has a protruding portion to indicate operational information, and
   the information indicators are formed such that a contour of the recessed portion is located inside a contour of the protruding portion when seen in a plate thickness direction of the covering.

2. The battery wiring module according to claim 1, wherein the covering is provided with a hinge so as to be openable and closable relative to the housing.

* * * * *